(12) United States Patent
Cohen et al.

(10) Patent No.: US 12,361,526 B2
(45) Date of Patent: *Jul. 15, 2025

(54) RECONSTRUCTION OF A DISTORTED IMAGE OF AN ARRAY OF STRUCTURAL ELEMENTS OF A SPECIMEN

(71) Applicant: Applied Materials Israel Ltd., Rehovot (IL)

(72) Inventors: Yehuda Cohen, Moshav Timorim (IL); Rafael Bistritzer, Petach Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,001

(22) Filed: Sep. 12, 2023

(65) Prior Publication Data

US 2023/0419456 A1 Dec. 28, 2023

Related U.S. Application Data

(63) Continuation of application No. 16/922,972, filed on Jul. 7, 2020, now Pat. No. 11,798,138.

(51) Int. Cl.
*G06K 9/00* (2022.01)
*G01N 21/88* (2006.01)
(Continued)

(52) U.S. Cl.
CPC ........... *G06T 5/73* (2024.01); *G01N 21/8851* (2013.01); *G01N 21/9501* (2013.01); *G06T 3/10* (2024.01);
(Continued)

(58) Field of Classification Search
CPC .... G06T 3/00; G06T 3/02; G06T 3/10; G06T 3/14; G06T 3/147; G06T 3/153; G06T 3/18; G06T 3/40; G06T 3/4053; G06T 3/4069; G06T 3/60; G06T 5/00; G06T 5/70; G06T 5/73; G06T 5/80; G06T 7/0002; G06T 7/0004; G06T 7/30; G06T 7/32; G06T 7/35; G06T 7/70; G06T 7/73; G06T 7/74; G06T 2207/30108; G06T 2207/30141; G06T 2207/30148; G06T 2207/30164;
(Continued)

(56) References Cited

U.S. PATENT DOCUMENTS 6,865,288 B1 3/2005 Shishido
7,366,343 B2 4/2008 Takeuchi
(Continued)

*Primary Examiner* — Eric Rush
(74) *Attorney, Agent, or Firm* — LOWENSTEIN SANDLER LLP

(57) ABSTRACT

There is provided a method and a system configured to compensate for image distortions. An example method includes first receiving a warped image of an array of cells of a specimen. Each cell of the array comprises one or more structural elements of a substrate. A reference image of a region associated with a cell of the array of cells is generated and a first cell of the array of cells is identified using the reference image and at least part of the warped image. One or more locations comprising cells that differ from the first cell are identified and, based at least on the one or more locations, a warped compensation transform is determined. The warped compensation transform is applied on the warped image to generate an undistorted image.

20 Claims, 12 Drawing Sheets

(51) Int. Cl.
*G01N 21/95* (2006.01)
*G06T 3/10* (2024.01)
*G06T 3/18* (2024.01)
*G06T 5/73* (2024.01)
*G06T 5/80* (2024.01)
*G06T 7/00* (2017.01)
*G06T 7/70* (2017.01)
*G06V 10/22* (2022.01)
*G06V 10/24* (2022.01)
*H04N 1/387* (2006.01)

(52) U.S. Cl.
CPC .............. *G06T 3/18* (2024.01); *G06T 5/80* (2024.01); *G06T 7/0004* (2013.01); *G06T 7/70* (2017.01); *G06V 10/22* (2022.01); *G06V 10/243* (2022.01); *G06V 10/247* (2022.01); *H04N 1/387* (2013.01); *G06T 2207/30148* (2013.01)

(58) Field of Classification Search
CPC .... H04N 1/387; H04N 1/3872; H04N 1/3873; H04N 1/3875; H04N 1/3878; G06V 10/20; G06V 10/22; G06V 10/24; G06V 10/243; G06V 10/247; G06V 10/32; G06V 10/34; G06V 10/36; G01N 21/8803; G01N 21/8851; G01N 21/9501; G01N 21/9503; G01N 21/9505; H01L 21/67288; H01L 21/68; H01L 21/681; H01L 21/682
USPC ....... 382/100, 103, 141, 143–149, 151, 152, 382/190, 195, 199, 201, 209, 215–219, 382/254, 260, 264, 275–278, 282, 283, 382/291, 293, 295, 298, 299; 358/1.2, 358/1.5, 3.2, 3.21, 3.26, 3.27; 345/418, 345/606, 611, 613, 619, 645–648; 348/86–88, 92, 94, 95, 125, 126, 129, 348/134

See application file for complete search history.

(56) References Cited

U.S. PATENT DOCUMENTS

| | | | |
|---|---|---|---|
| 7,565,032 B2* | 7/2009 | Oaki | G06T 7/0004 |
| | | | 382/144 |
| 10,281,415 B2 | 5/2019 | Inoue | |
| 2001/0053245 A1 | 12/2001 | Sakai | |
| 2004/0146202 A1* | 7/2004 | Hyoki | G06T 7/001 |
| | | | 382/141 |
| 2004/0263834 A1 | 12/2004 | Alumot | |
| 2006/0243922 A1* | 11/2006 | Aloni | G03F 7/70375 |
| | | | 250/492.22 |
| 2006/0243992 A1 | 11/2006 | Ikoma et al. | |
| 2007/0229665 A1 | 10/2007 | Tobiason | |
| 2008/0259326 A1* | 10/2008 | Kutscher | G01N 21/4738 |
| | | | 356/237.5 |
| 2009/0257644 A1 | 10/2009 | Dodzin | |
| 2011/0075937 A1 | 3/2011 | Tate | |
| 2012/0308113 A1 | 12/2012 | Dodzin | |
| 2013/0195373 A1* | 8/2013 | Shibata | G06T 5/73 |
| | | | 382/263 |
| 2014/0177941 A1 | 6/2014 | Docherty | |
| 2016/0275672 A1* | 9/2016 | Bhattacharyya | G06T 7/33 |
| 2017/0228866 A1* | 8/2017 | Jain | G06T 7/001 |
| 2019/0195815 A1* | 6/2019 | Kikuiri | H01J 37/244 |
| 2020/0126830 A1 | 4/2020 | Dowling | |
| 2020/0286709 A1* | 9/2020 | Shiratsuchi | H01J 37/22 |

* cited by examiner

RECONSTRUCTION OF A DISTORTED IMAGE OF AN ARRAY OF STRUCTURAL ELEMENTS OF A SPECIMEN

RELATED APPLICATION

This application a continuation of U.S. patent application Ser. No. 16/922,972, filed Jul. 7, 2020, the entire contents of which is hereby incorporated by reference herein.

TECHNICAL FIELD

The presently disclosed subject matter relates, in general, to the field of examination of a specimen, and more specifically, to image reconstruction.

BACKGROUND

Semiconductor specimen (hereinafter—"specimen") are manufactured by a highly complex process that must be monitored.

The monitoring may be executed by optical devices, and additionally or alternatively, by charged particle devices.

The monitoring may include acquiring images by charged particle devices that scan the specimen with an electron beam.

The acquired images may be distorted due to various factors—including but not limited to—mechanical drift and charging of the specimen.

There is a growing need to receive a distorted image and reconstruct the image.

SUMMARY

A system, a method, and a non-transitory computer readable medium as illustrated in at least one out of the specification, the drawings, and the claims.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
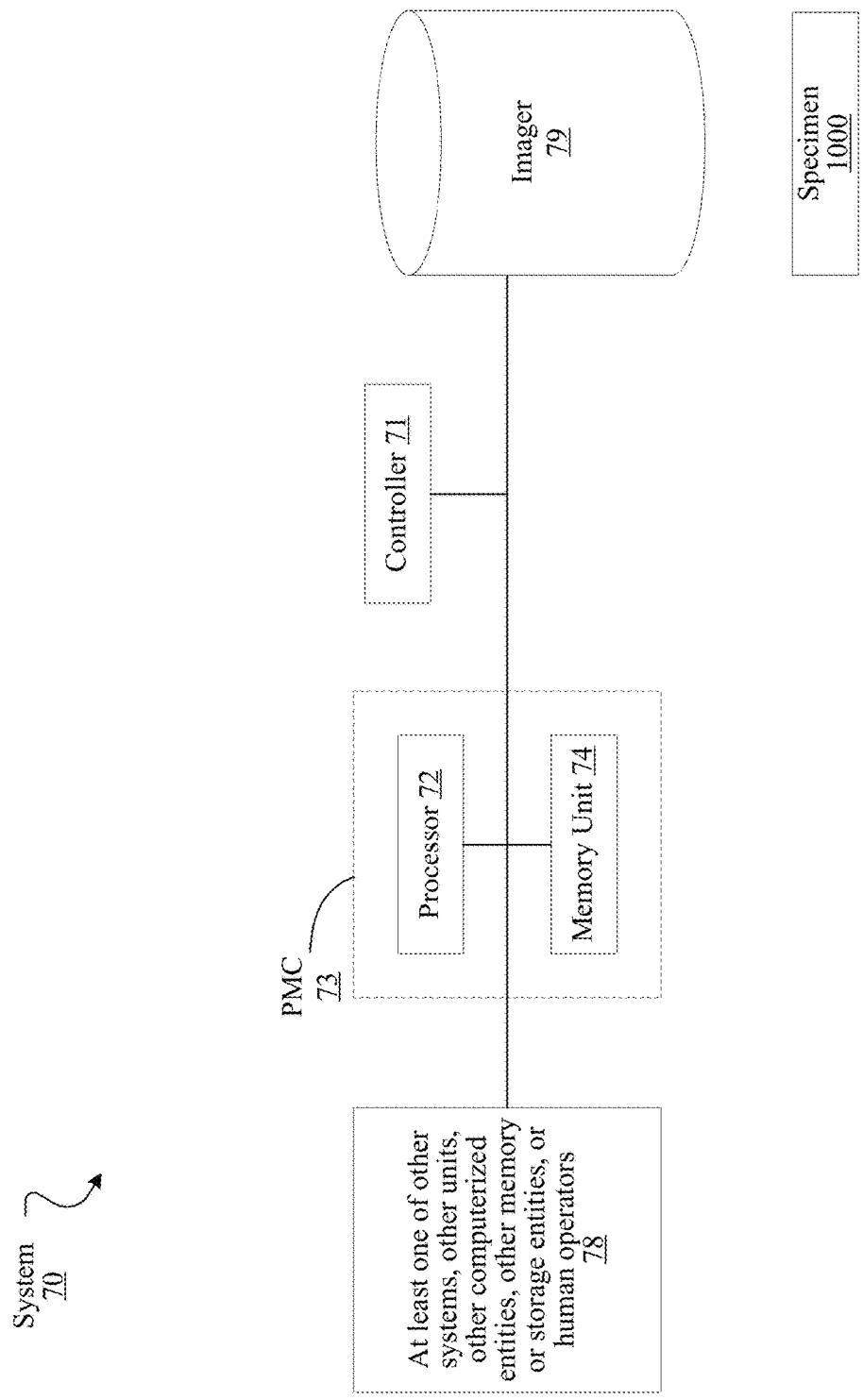
FIG. 1 illustrates an example of a specimen and a system.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

Unless specifically stated otherwise, as apparent from the following discussions, it is appreciated that throughout the specification discussions utilizing terms such as "processing", "obtaining", "selecting", "determining", "generating", "outputting", "using", "performing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise. Design data may also be a computer aided design (CAD) data.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

FIG. 1 is an example of specimen 1000 and system 70 in accordance with certain embodiments of the presently disclosed subject matter.

System 70 can be used for examination of a specimen (e.g. of a wafer and/or parts thereof) as a part of the specimen fabrication process. System 70 may be configured to communicate with at least one out of other systems, other units, other computerized entities, other memory or storage entities, human operators—collectively denoted 78. The other memory or storage entities may include, for example, memory resources such as a design data server and a data repository.

System 70 may include an imager 79 for acquiring images, controller 71, processor 72, and memory unit 74. The processor and the memory unit may form a processor and memory circuitry (PMC) 73. The imager 79 may include electron optics and any other components and/or units required for generating an image using one or more charged particle beams.

PMC 73 may be part of system 70, may be located outside system 70, and the like. Some of the functionality of the PMC may be implemented by system 70 while another functionality may be executed by memory and computational resources that do not belong to the system 70. For example—a reconstruction of an image may be executed solely by system 70, partially by system or only by memory and computational resources that do not belong to the system 70.

PMC 73 is configured to provide all or at least some of the processing necessary executing any of the mentioned below methods.

Processor 72 may be configured to execute several functional modules in accordance with computer-readable instructions implemented on a non-transitory computer-readable memory of the PMC. Such functional modules are referred to hereinafter as comprised in the PMC. Processor 72 may be or may include any processing circuits—such as a deep neural network (DNN) processor, a graphic processing unit, a general purpose unit, a central processing unit, an accelerator, and the like.

System 70 may be configured to receive, via one or more input interfaces, input data. Input data can include data (and/or derivatives thereof and/or metadata associated therewith) produced by the examination tools and/or data produced and/or stored in one or more data repositories and/or in design data server and/or another relevant data depository. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

System 70 is further configured to process at least part of the received input data and send, via one or more output interfaces, the results (or part thereof) outside system 700—for example to a storage system, to one or more examination tool(s), to a computer-based graphical user interface (GUI) for rendering the results and/or to external systems (e.g. Yield Management System (YMS) of a FAB). The GUI can be further configured to enable user-specified inputs related to operating system.

It is noted that system 70 can be implemented in a distributed computing environment, in which the aforementioned functional modules shown in FIG. 1 can be distributed over several local and/or remote devices, and can be linked through a communication network.

Figure 2:
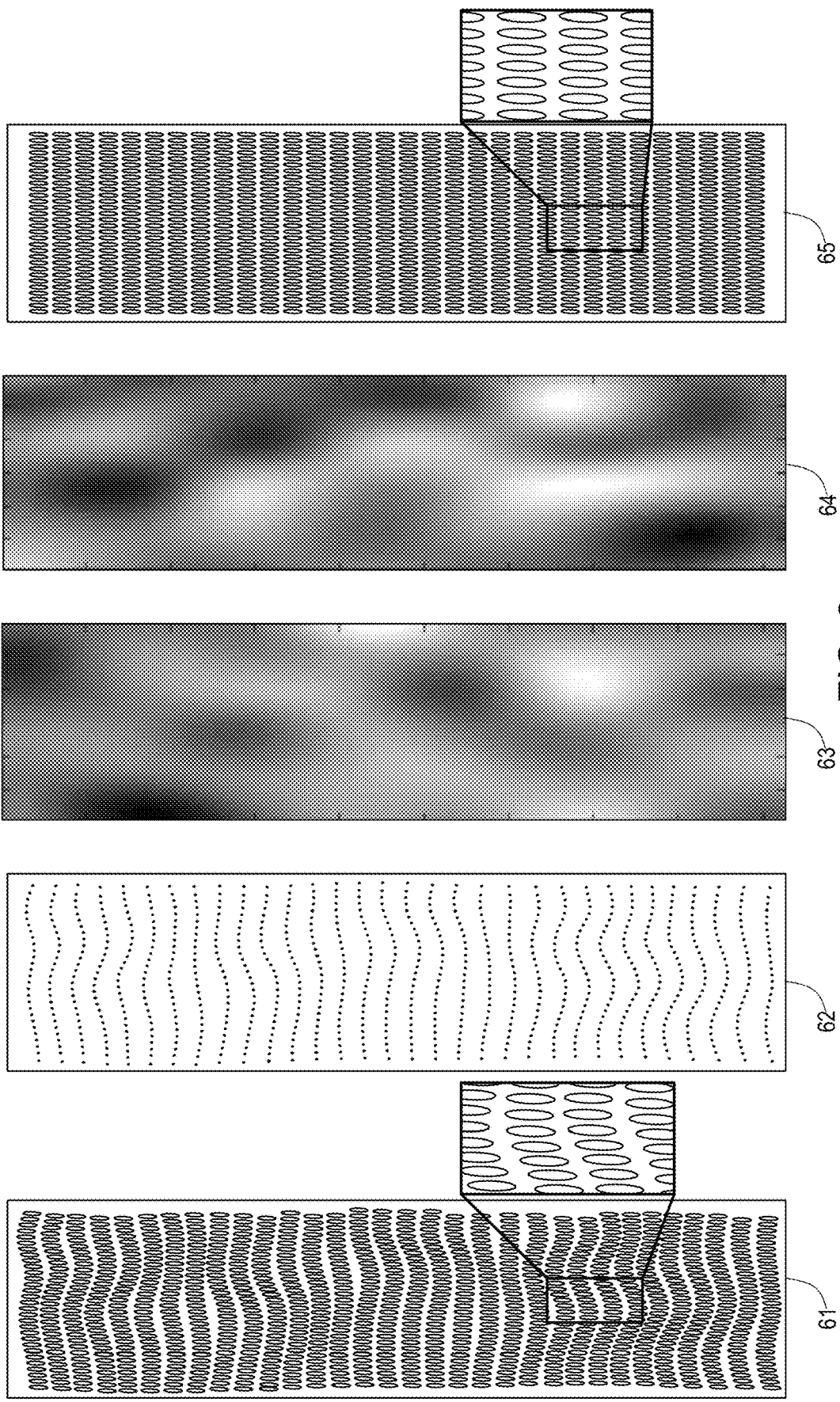
FIG. 2 illustrates examples of various images and data generated during a reconstruction of an image.

FIG. 2 illustrates examples of various images and data generated during a reconstruction of an image—such as distorted image 61, locations of centers of cells 62, first map of x-axis location distortion per pixel 63, second map of y-axis location distortion per cell 64, and reconstructed image 65.

The first and second maps provide the distortion in x-axis and y-axis per pixel of the distorted image. The location distortions represented by the maps should be compensated by a distortion compensation transform.

Figure 3:
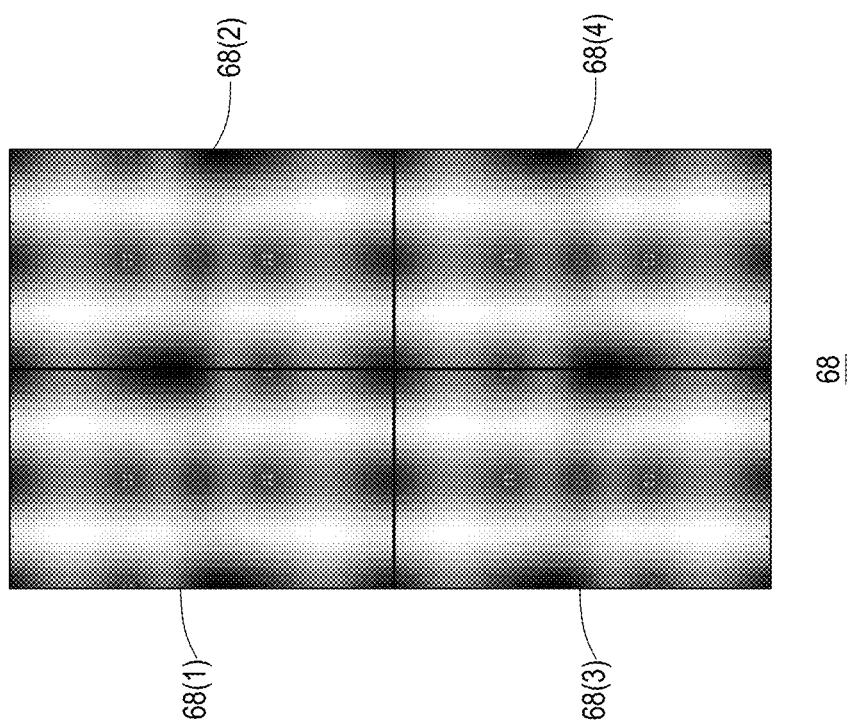
FIG. 3 illustrates an example of a cell and a sub-cell.

FIG. 3 illustrates an example of a cell 68 and four sub-cells 68(1), 68(2), 68(3) and 68(4) of cell 68. Each cell has significant gradient in both x and y directions.

Figure 4:
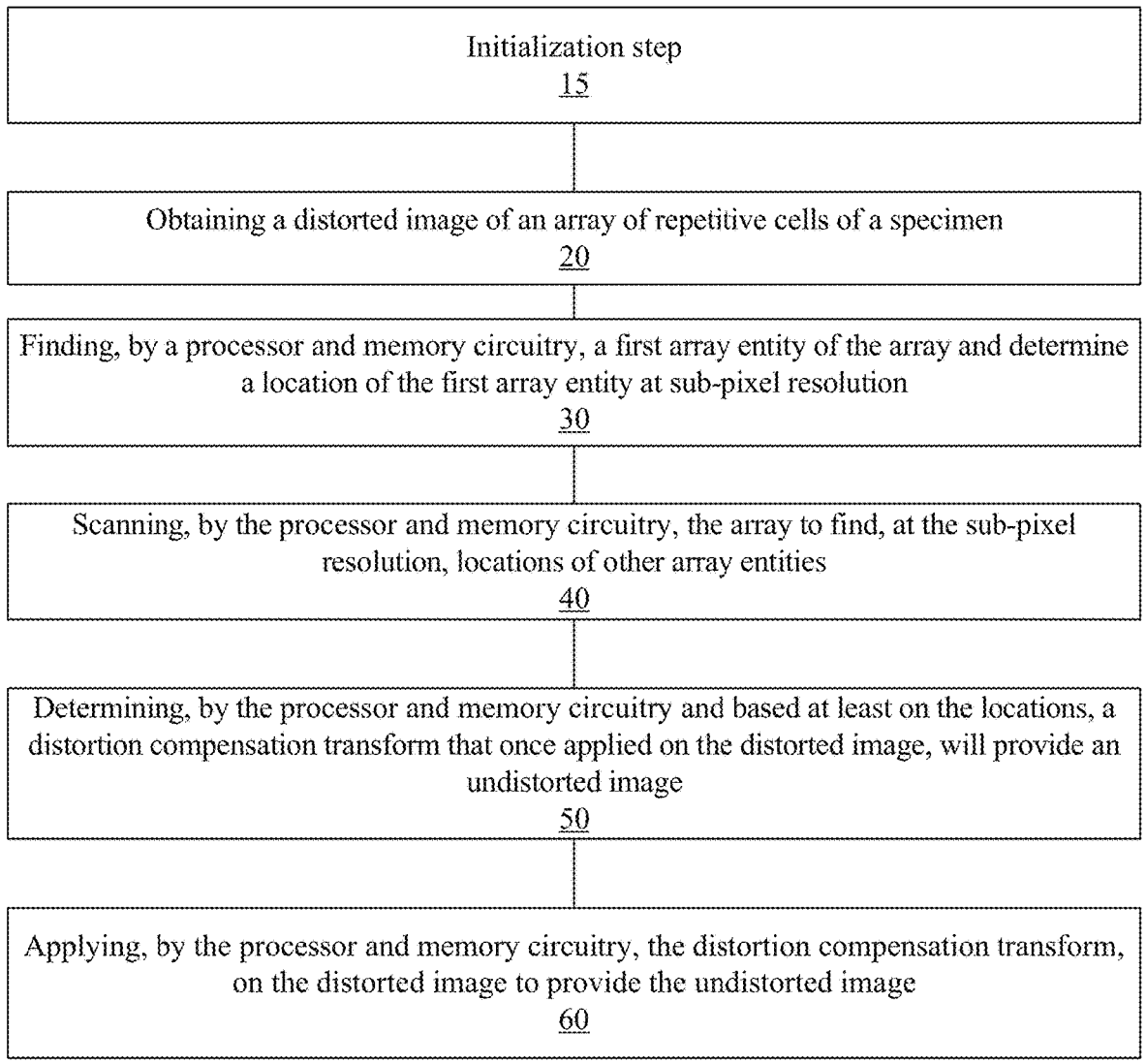
FIG. 4 illustrates an example of a method.

FIG. 4 illustrates an example of method 10 for examining a specimen.

Method 10 may start by initialization step 15.

The initialization step 15 may include at least one out of:
a. Determining whether an input image (which is distorted) should be decimated before the execution of various steps of method 10—and if so—determining a decimation factor to be applied on the input image.
b. Determining whether a cell of the distorted image should be virtually segmented to sub-cells, and if so—what should be the size of the sub-cell.
c. Receiving (from example—from a recipe) an indication or instruction regarding whether the input image should be segmented and of so—what is the decimation factor.
d. Receiving (from example—from a recipe) an indication or instruction regarding whether a cell of the distorted image should be virtually segmented to sub-cells, and if so—what should be the size of the sub-cell.
e. Determining a scan pattern.
f. Receiving (from example—from a recipe) an indication or instruction regarding the scan pattern.

It may be beneficial to segment cells to sub-cells in order to increase the number of measured locations per area unit. The segmentation should consider the content of the cell—and each sub-cell should have an anchor or any other distinguishable information along any of the relevant axes. For example—it should include a significant gradient (change of pixel intensities) along any of the relevant axes.

If the array is a two-dimensional array than the relevant axes may be the x-axis and the y-axis. If the array include structural elements that do not change along one axis (for example—an array of rectangular shaped lines that do not change along one axis) then there is only one relevant axis.

Initialization step 15 may be followed by step 20 of obtaining a distorted image of an array of repetitive cells of a specimen, each cell comprises one or more structural elements.

Some of the following steps refer to an array entity. An array entity may be a cell or a sub-cell.

Example of cells may include memory cells (such as SRAM, DRAM, FRAM, Flash memory), programmable logic cells, etc. These examples are not limitative. Generally, the cells arranged in each array according to a repetitive pattern or grid. For example, distance between two adjacent cells (according to a horizontal axis and a vertical axis) is constant or at least substantially constant among the various arrays.

Step 20 may include decimating an input image to provide the distorted image.

Step 20 may be followed by step 30 of finding, by a processor and memory circuitry, a first array entity of the array and determine a location of the first array entity at sub-pixel resolution. The first array entity may be selected in any manner—random, pseudo-random, deterministic and the like. It may be preferred to select an array entity that is not located at the border of the array.

Figure 5:
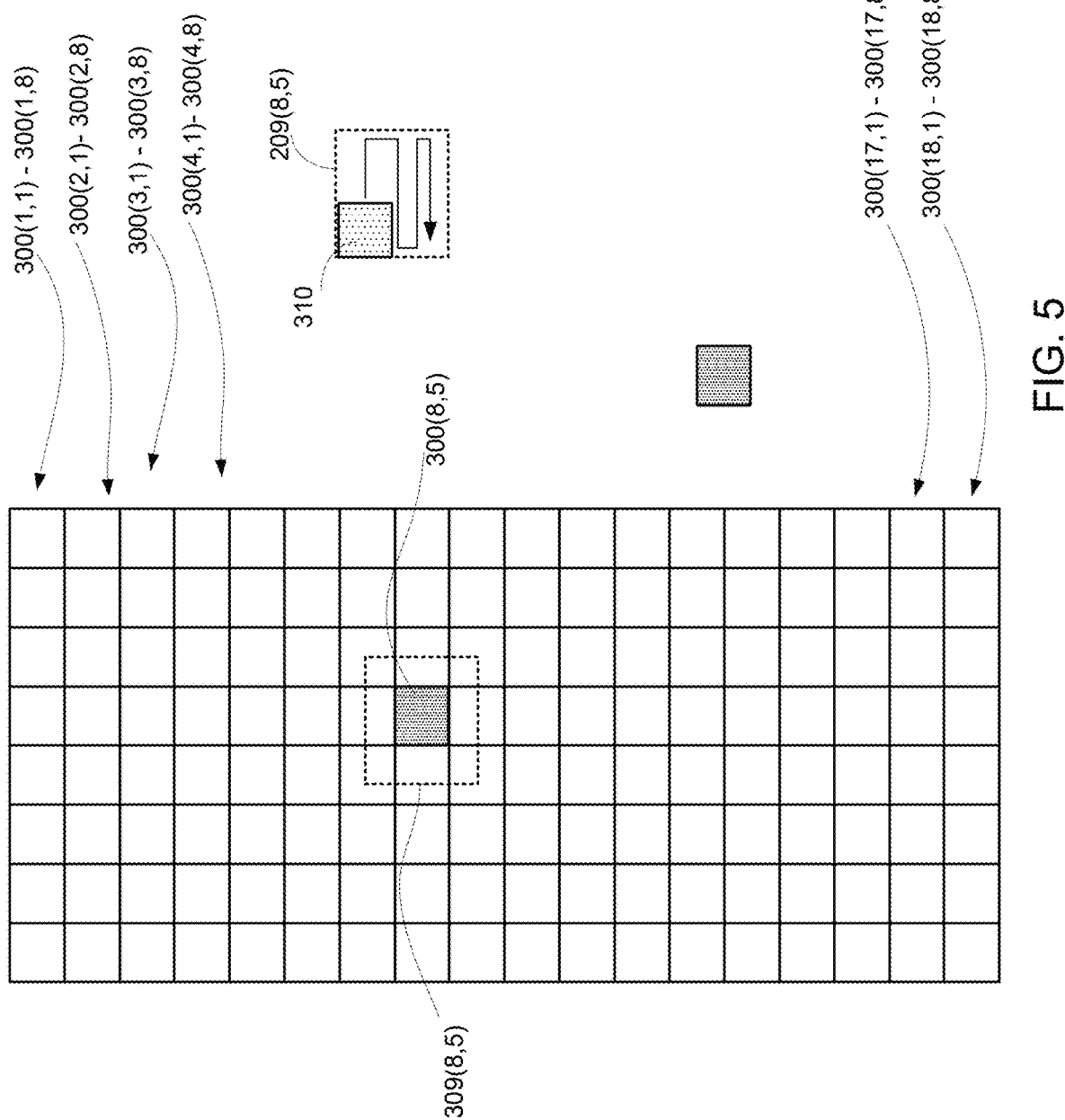
FIG. 5 illustrates an example of cells, sub-cells and locations.

Referring to FIG. 5—an array of cells 300(1,1)-300(8,18) is provided and a first cell 300(8,5) is selected. The location of the first cell is found by correlating (box 311) a golden cell 310 the pixels within a search window 309(8,5) that include the first cell and its vicinity (for example—search window 309(8,5) has a width of twice the width of the first cell and has a length that is twice the length of the first cell). The correlation provides a pixel resolution location of the first cell. The correlation is followed by a sub-pixel resolution determination of the location of the first cell.

Referring back to FIG. 4—Step 30 may be followed by step 40 of scanning, by the processor and memory circuitry, the array to find, at the sub-pixel resolution, locations of other array entities.

The scanning may involve applying the scan pattern.

A scan pattern may be applied at steps that correspond to one or more dimensions (height and/or length) of a cell of the array. For example—the scan pattern may dictate scanning one array entity after the other—for example scanning the same sub-cell of different cells—row by row or column by column. Other scan patterns may be provided.

The location of an array entity may be the center of the array entity or any other point or points of the array entity.

Step 40 may include performing a correlation between a golden image of an array entity and a part of the distorted image that comprises the array entity and a vicinity of the array entity, and (b) performing a two dimensional sub-pixel matching.

The vicinity of the array entity may be defined to include allowed location deviations of the array entity from its neighbour (in case of a sub-cell—the corresponding sub-cell at a neighboring cell). For example—the vicinity may be of width that is twice the width of the array entity, and the vicinity may be of a length that is twice the length of the array entity.

Figure 6:
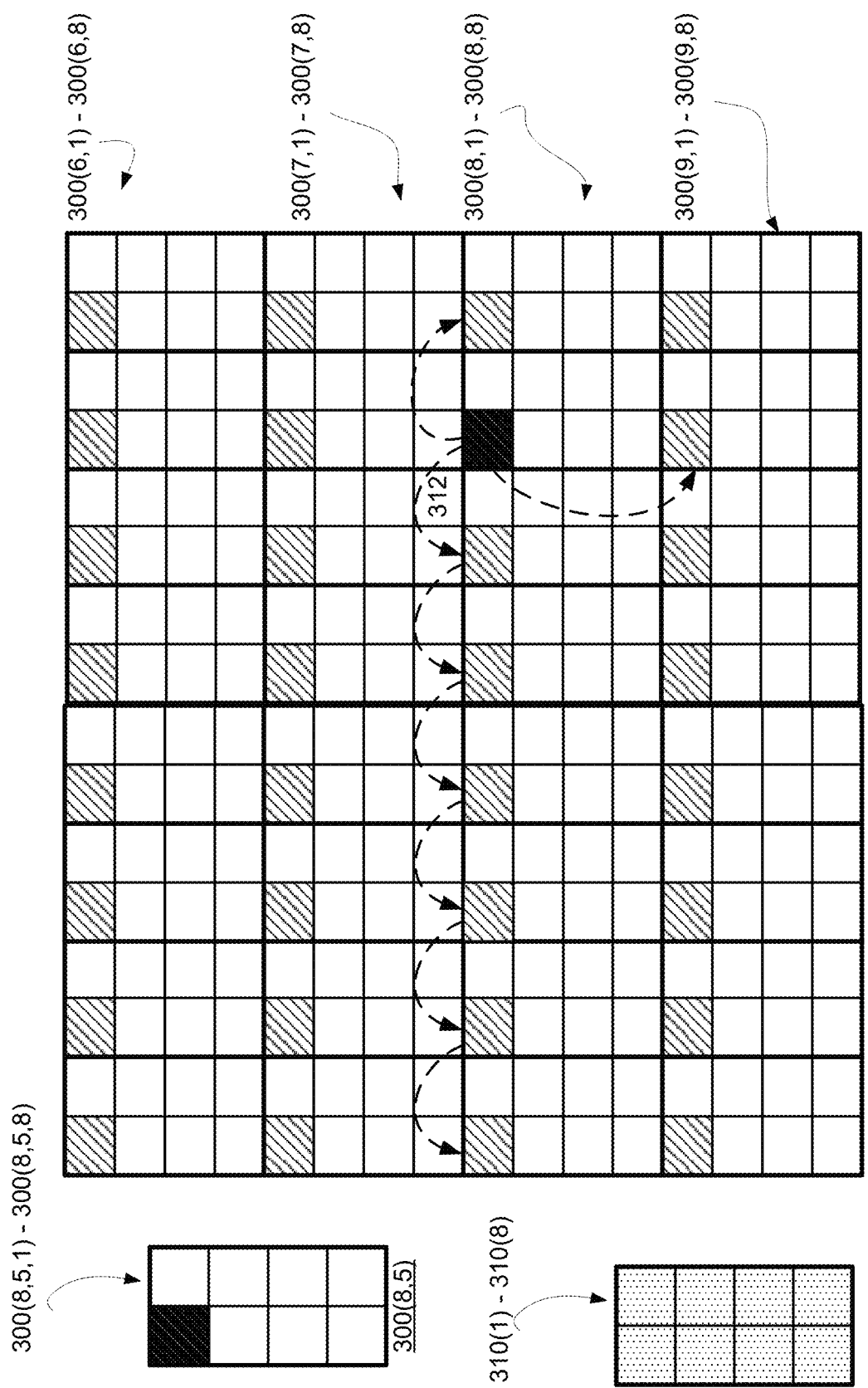
FIG. 6 illustrates an example of cells, sub-cells and locations.

Referring to FIG. 6—illustrating four rows of cells **300 (6,1)\*300(9,8). Each cell is segmented to eight sub-cells 300(8,5,1)-300(8,5,8) and after a certain sub-cell is selected its location is found by correlating the certain sub-cell to a corresponding golden sub-cell out of 310(1)-310(8)**. This is followed by sub-pixel resolution location determination.

Referring to FIG. 6—a scanning of a left upmost sub-cell of each cell of cells 300(6,1)-300(9,8) is shown. The scanning may be executed one row after the other—or in any other manner.

Referring back to FIG. 4—step 40 may be followed by step 50 of determining, by the processor and memory circuitry and based at least on the locations, a distortion compensation transform that once applied on the distorted image, will provide an undistorted image.

Step 50 may be followed by step 60 of applying, by the processor and memory circuitry, the distortion compensation transform, on the distorted image to provide the undistorted image.

Step 40 may include searching for suspected-location array entities that are associated with unreliable determined locations.

The reliability can be determined in various manners—for example by comparing the locations of cells to an expected or allowed pattern of locations or adjacent cells—and marking as suspected cell as a cell has a location that deviated from the pattern. For example assuming that the distances (along the X-axis) between a row of four adjacent cells are 10, 10 and 12. Assuming that the allowed difference in distances between adjacent cells should not exceed one then the fourth cell is deemed to be a suspicious cell. The same applies to a sub-cell.

If suspected-location array entities are found then step 50 should consider the presence of suspected-location array entities and step 60 may include determining locations of the suspected-location array entities based on locations of other array entities. For example—determining a location of a suspected-location array entity based on neighboring array entities. For example—by applying an average of pixels of adjacent suspected-location array entities to generate the array entity.

Step 60 may include smoothing locations of different cells based on differences between location deviations between adjacent cells. Thus—a filter may be applied to reduce or delete location deviations.

Step 50 may include defining at least one spline kernel to be applied on at least one part of the distorted image At least steps 20, 30, 40, 50 and 60 may be executed in run-time and during an evaluation of the specimen.

Step 10 may be executed once per multiple iterations of steps 20, 30, 40, 50, and 60.

In the following examples it is assumed, for simplicity of explanation, that the distorted image is a warped image.

Figure 7:
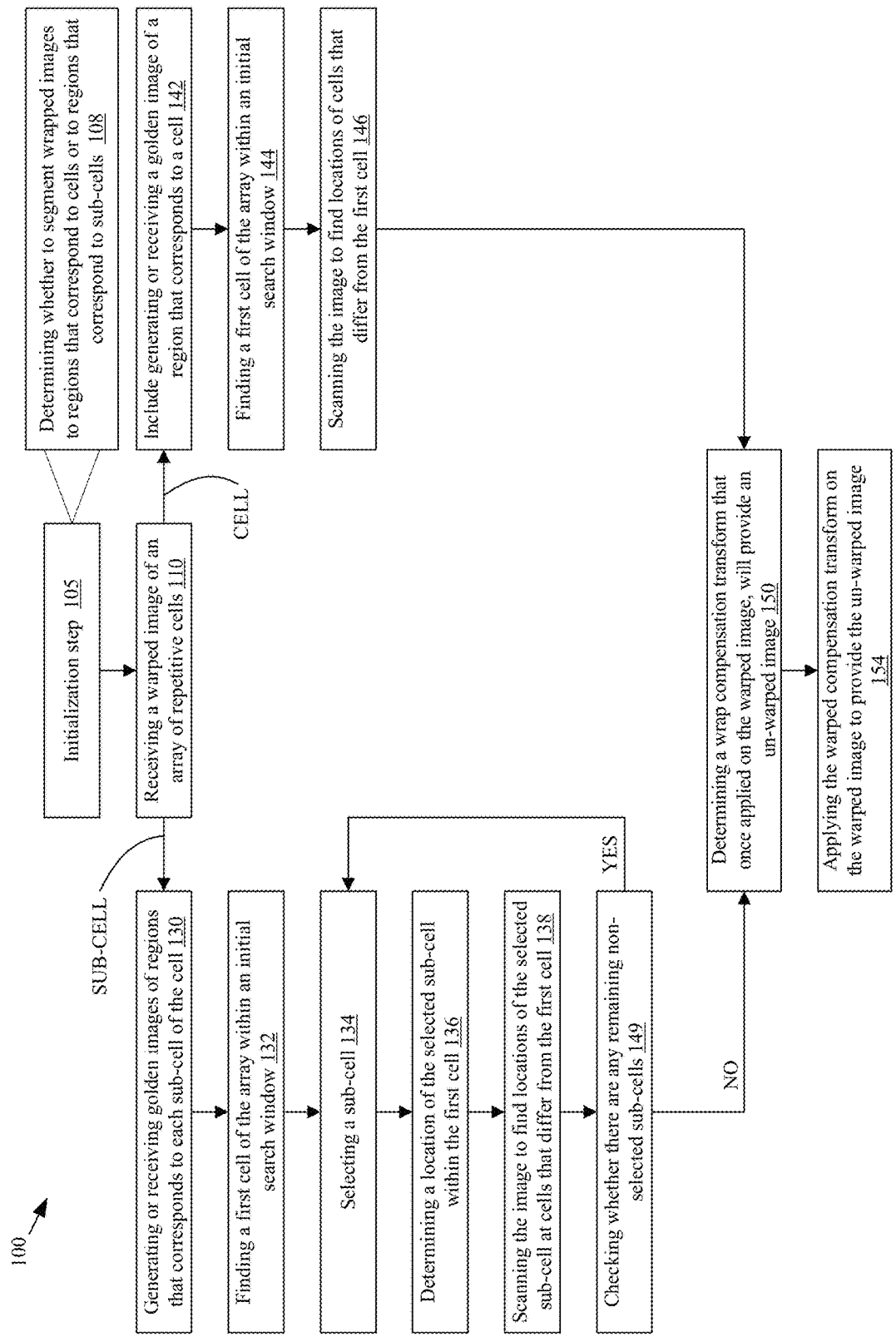
FIG. 7 illustrates an example of a method.

FIG. 7 illustrates method 100.

Method 100 may start by initialization step 105.

Step 105 may include step 108 of determining whether to segment warped images to regions that correspond to cells or to regions that correspond to sub-cells. Accordingly—step 108 includes determining whether the array entity is a cell or a sub-cell.

Step 105 may include any element of step 15.

Step 105 may be followed by step 110 of receiving a warped image of an array of repetitive cells, each cell includes one or more structural elements of a substrate.

If it is determined that the array entity is a sub-cell then step 110 is followed by a step 130.

Step 130 may include generating or receiving golden images of regions that corresponds to each sub-cell of the cell. The golden images may be generated using design data and/or acquired images and the like.

Step 130 may be followed by step 132 of finding a first cell of the array within an initial search window. Step 132 may include using the golden images of the sub-cells (or a golden image of the cell) and a part of the warped image. For example—finding correlating between the golden image of the cell and the part of the warped image and then perform sub-pixel matching.

Step 132 may be followed by steps 134, 136, 138 and 149 of scanning the array for sub-cells.

Step 134 include selecting a sub-cell.

Step 134 may be followed by step 136 of determining a location of the selected sub-cell within the first cell. This may include calculating a known offset from the center of the first cell to the center of the selected sub-cell and then performing a sub-pixel matching.

Step 136 may be followed by step 138 of scanning the image to find locations of the selected sub-cell at cells that differ from the first cell.

Step 138 may be followed by step 149 of checking whether there are any remaining non-selected sub-cells. Is no—then all sub-cells of the array were located and step 149 may be followed by step 150. Else—jumping to step 134.

If it is determined that the array entity is a cell then step 110 is followed by a step 142.

Step 142 may include generating or receiving a golden image of a region that corresponds to a cell. The golden image may be generated using design data and/or acquired images and the like.

Step 142 may be followed by step 144 of finding a first cell of the array within an initial search window. Step 132 may include using the golden image of the cell and a part of the warped image. For example—finding correlating between the golden image and the part of the warped image and then perform sub-pixel matching.

Step 144 may be followed by step 146 of scanning the image to find locations of cells that differ from the first cell.

Step 146 may be followed by step 150.

Step 150 may include determining a wrap compensation transform that once applied on the warped image, will provide an un-warped image.

Step 150 may be followed by step 154 of applying the warped compensation transform on the warped image to provide the un-warped image.

Figure 8:
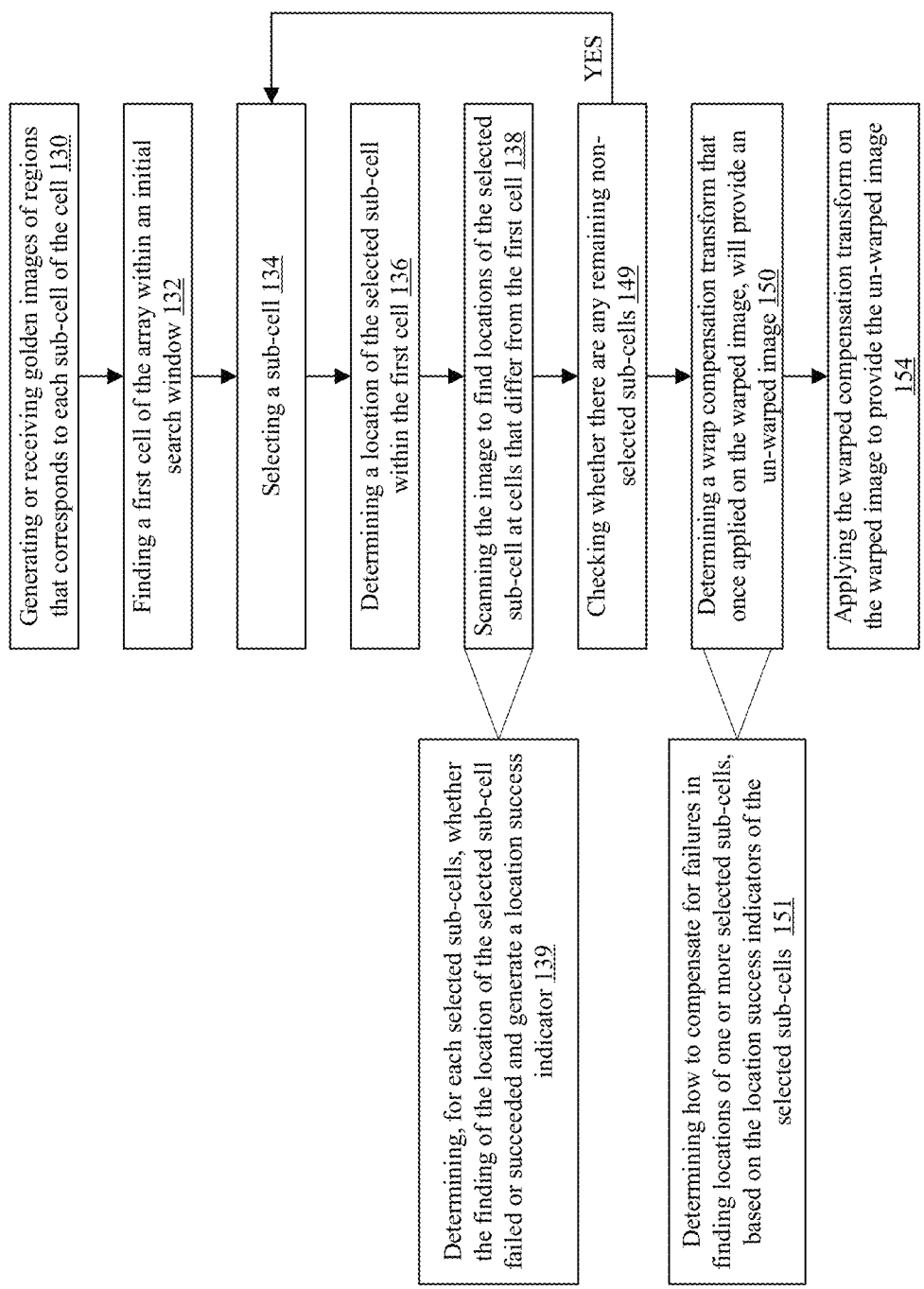
FIG. 8 illustrates an example of some steps of the method of FIG. 7.

FIG. 8 illustrates some steps of method 100.

FIG. 8 illustrates that step 138 may include step 139 of determining, for each selected sub-cells, whether the finding of the location of the selected sub-cell failed or succeeded and generate a location success indicator.

FIG. 8 also illustrates that step 150 may include step 151 of determining how to compensate for failures in finding locations of one or more selected sub-cells, based on the location success indicators of the selected sub-cells.

Figure 9:
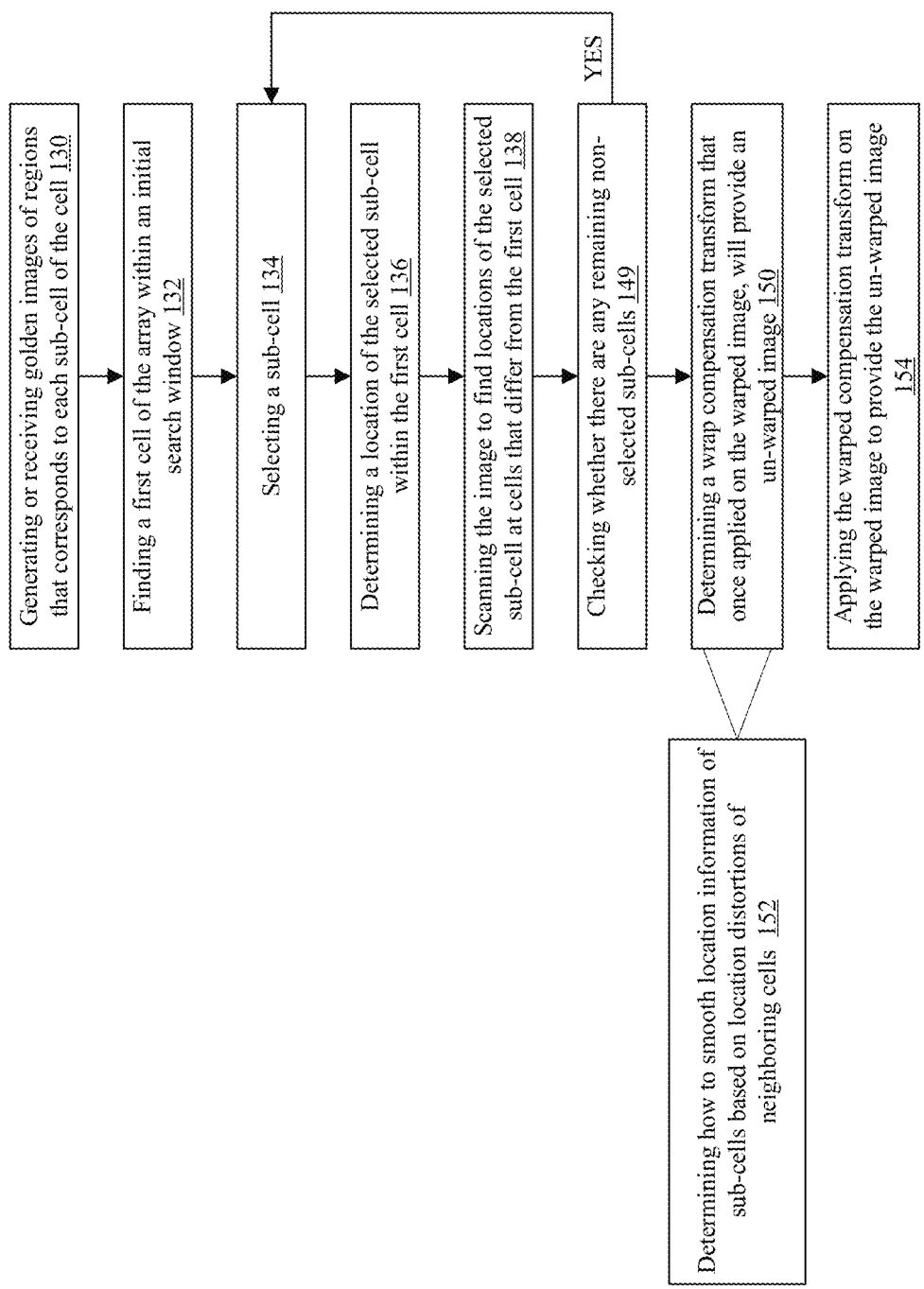
FIG. 9 illustrates an example of some steps of the method of FIG. 7.

FIG. 9 illustrates some steps of method 100. FIG. 9 illustrates that step 150 may include step 152 of determining how to smooth location information of sub-cells based on location distortions of neighboring cells.

Figure 10:
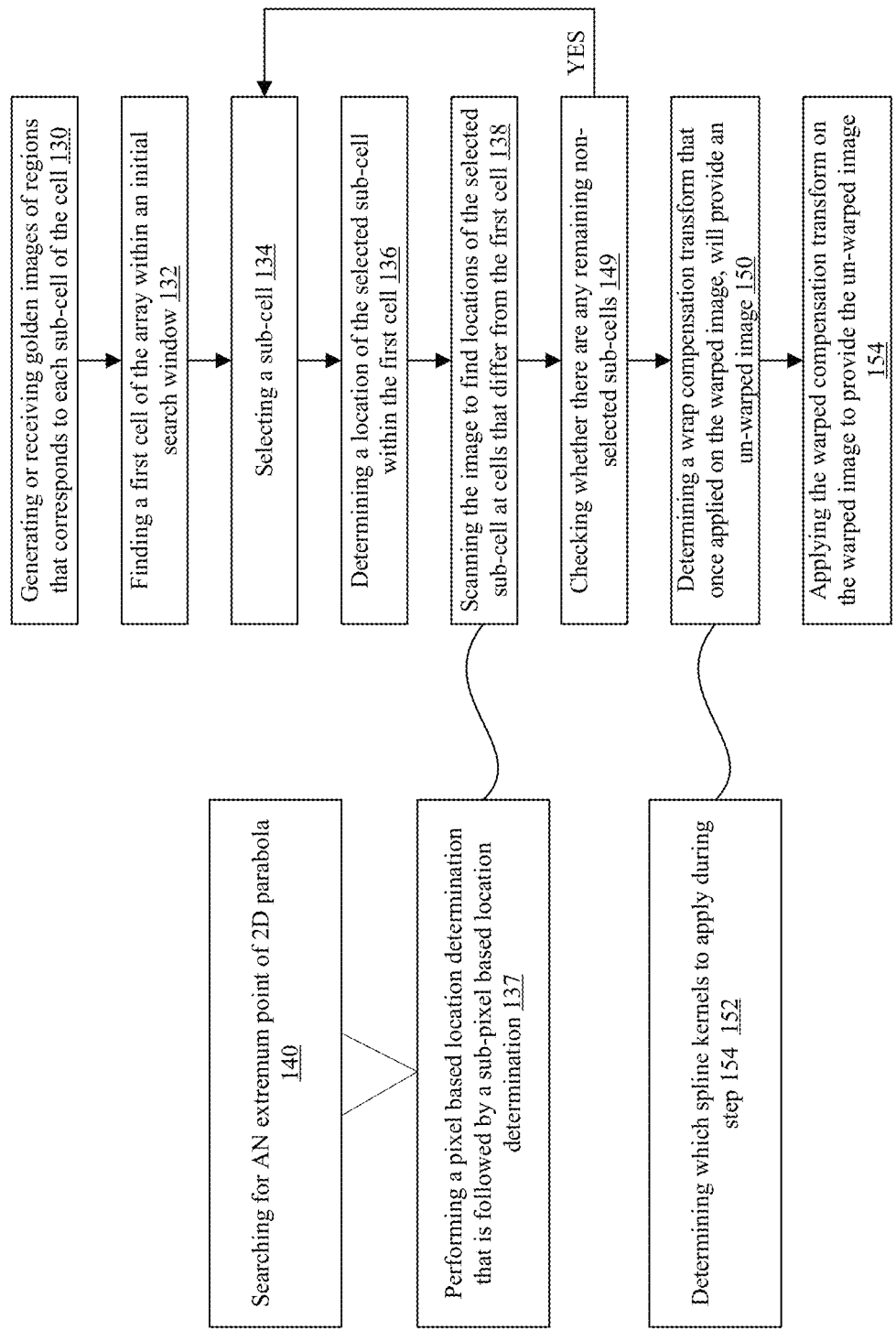
FIG. 10 illustrates an example of some steps of the method of FIG. 7.

FIG. 10 illustrates some steps of method 100. FIG. 10 illustrates that step 138 may include step 137 of performing a pixel based location determination that is followed by a sub-pixel based location determination. Step 137 may include step 140 of searching for AN extremum point of 2D parabola. The location of the selected sub-cell is located at the extremum point. FIG. 10 also illustrates that step 150 may include step 153 of determining which spline kernels to apply during step 154.

Figure 11:
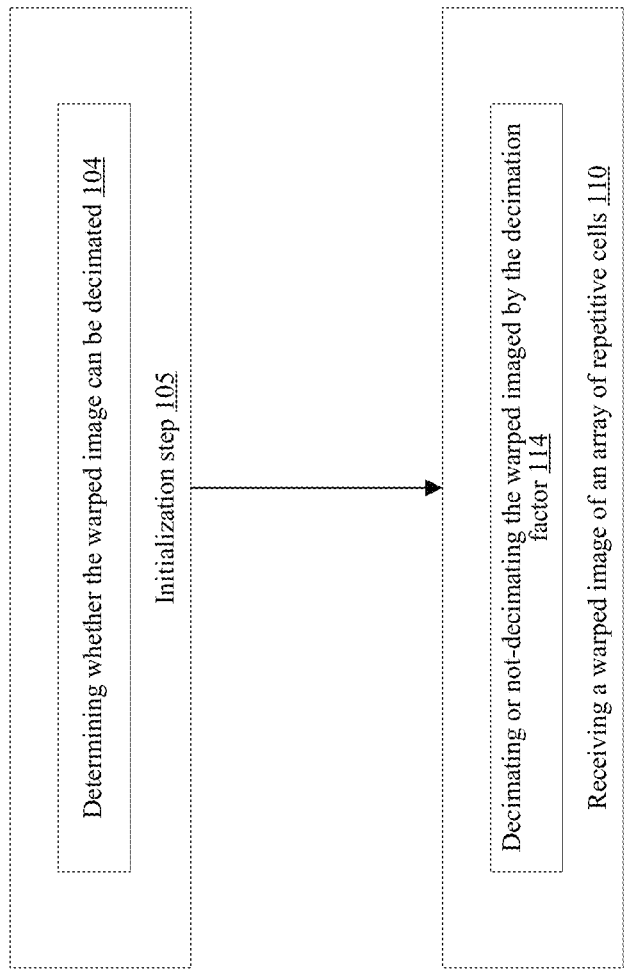
FIG. 11 illustrates an example of some steps of the method of FIG. 7.

FIG. 11 illustrates some steps of method 100. FIG. 11 illustrates that step 105 may include step 104 of determining whether the warped image can be decimated—and if so—what is a decimation factor to apply.

FIG. 11 also illustrates that step 110 may include step 114 of decimating or not-decimating the warped imaged by the decimation factor, based on the determination of step 104.

Figure 12:
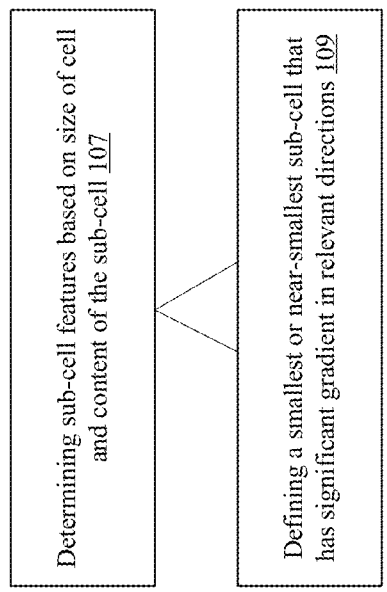
FIG. 12 illustrates an example of some steps of the method of FIG. 7.

FIG. 12 illustrates step 105 as including (a) step 107 of determining sub-cell features based on size of cell and content of the sub-cell, and (b) step 109 of defining a smallest or near-smallest sub-cell that has significant gradient in relevant directions. Step 109 may include determining the significant gradient based on whether the array is a 2D array or 1D array along a certain direction.

It is to be understood that the invention is not limited in its application to the details set forth in the description contained herein or illustrated in the drawings.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The embodiment may also be implemented in a computer program for running on a computer system, at least including code portions for performing steps of a method according to the embodiment when run on a programmable apparatus, such as a computer system or enabling a programmable apparatus to perform functions of a device or system according to the embodiment. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

The foregoing specification, includes specific examples of one or more embodiments. It will, however, be evident that various modifications and changes may be made therein without departing from the broader spirit and scope of the one or more embodiments as set forth in the appended claims.

What is claimed is:

1. A system, comprising:
   a memory device; and
   a processing device, operatively coupled to the memory device, the processing device to:
   receive a warped image of an array of cells of a specimen, wherein cell of the array of cells comprises one or more structural elements of a substrate;
   segment each cell of the array of cells into a respective plurality of sub-cells, wherein a size of one or more of the respective plurality of sub-cells is determined using a recipe and wherein the one or more of the respective plurality of sub-cells comprises distinguishable information;
   generate a set of reference images of a set of regions associated with a set of sub-cells from one or more of the respective plurality of sub-cells;
   identify a first cell of the array of cells using a reference image of the set of reference images and at least part of the warped image;
   select a first sub-cell from a plurality of sub-cells of the first cell;

identify one or more locations comprising sub-cells that differ from the first sub-cell;

determine, based at least on the one or more locations, a warped compensation transform; and apply the warped compensation transform on the warped image to generate an undistorted image.

2. The system of claim 1, wherein the processing device is further to:

determine whether array entities of the array of cells are cells or sub-cells based on at least one of (a) a size of a cell, (b) a predefined location accuracy, and (c) a content of a cell.

3. The system of claim 1, wherein a location of each array entity is a location of a center of the array entity.

4. The system of claim 1, wherein the processing device is further to:

search for suspected-location array entities that are associated with unreliable determined locations; and apply the warped compensation transform by determining locations of the suspected-location array entities based on locations of other array entities.

5. The system of claim 1, wherein the processing device is further to:

apply the warped compensation transform by smoothing locations of different array entities based on differences between location deviations between adjacent array entities.

6. The system of claim 1, wherein the processing device is further to:

find a location of an array entity by (a) performing a correlation between a reference image of the array entity and a part of the warped image that comprises the array entity and a vicinity of the array entity, and (b) performing a two-dimensional sub-pixel matching.

7. The system of claim 1, wherein the processing device is further to:

determine the warped compensation transform by defining at least one spline kernel to be applied on at least one part of the warped image.

8. A method, comprising:

receiving a warped image of an array of cells of a specimen, wherein each cell of the array of cells comprises one or more structural elements of a substrate;

segmenting each cell of the array of cells into a respective plurality of sub-cells, wherein a size of one or more of the respective plurality of sub-cells is determined using a recipe and wherein the one or more of the respective plurality of sub-cells comprises distinguishable information;

generating a set of reference images of a set of regions associated with a set of sub-cells from one or more of the respective plurality of sub-cells;

identifying a first cell of the array of cells using a reference image of the set of reference images and at least part of the warped image;

selecting a first sub-cell from a plurality of sub-cells of the first cell;

identifying one or more locations comprising sub-cells that differ from the first sub-cell;

determining, based at least on the one or more locations, a warped compensation transform; and applying the warped compensation transform on the warped image to generate an undistorted image.

9. The method of claim 8, further comprising:

determining whether array entities of the array of cells are cells or sub-cells based on at least one of (a) a size of a cell, (b) a predefined location accuracy, and (c) a content of a cell.

10. The method of claim 8, wherein a location of each array entity is a location of a center of the array entity.

11. The method of claim 8, further comprising:

searching for suspected-location array entities that are associated with unreliable determined locations; and applying the warped compensation transform by determining locations of the suspected-location array entities based on locations of other array entities.

12. The method of claim 8, further comprising:

applying the warped compensation transform by smoothing locations of different array entities based on differences between location deviations between adjacent array entities.

13. The method of claim 8, further comprising:

finding a location of an array entity by (a) performing a correlation between a reference image of the array entity and a part of the warped image that comprises the array entity and a vicinity of the array entity, and (b) performing a two-dimensional sub-pixel matching.

14. The method of claim 8, further comprising:

determining the warped compensation transform by defining at least one spline kernel to be applied on at least one part of the warped image.

15. A non-transitory computer readable storage medium comprising instructions that, when executed by a processing device, cause the processing device to perform operations comprising:

receiving a warped image of an array of cells of a specimen, wherein each cell of the array of cells comprises one or more structural elements of a substrate;

segmenting each cell of the array of cells into a respective plurality of sub-cells, wherein a size of one or more of the respective plurality of sub-cells is determined using a recipe and wherein the one or more of the respective plurality of sub-cells comprises distinguishable information;

generating a set of reference images of a set of regions associated with a set of sub-cells from one or more of the respective plurality of sub-cells;

identifying a first cell of the array of cells using a reference image of the set of reference images and at least part of the warped image;

selecting a first sub-cell from a plurality of sub-cells of the first cell;

identifying one or more locations comprising sub-cells that differ from the first sub-cell;

determining, based at least on the one or more locations, a warped compensation transform; and applying the warped compensation transform on the warped image to generate an undistorted image.

16. The non-transitory computer readable storage medium of claim 15, wherein the operations further comprise:

determining whether array entities of the array of cells are cells or sub-cells based on at least one of (a) a size of a cell, (b) a predefined location accuracy, and (c) a content of a cell.

17. The non-transitory computer readable storage medium of claim 15, wherein a location of each array entity is a location of a center of the array entity.

18. The non-transitory computer readable storage medium of claim 15, wherein the operations further comprise:
  searching for suspected-location array entities that are associated with unreliable determined locations; and
  applying the warped compensation transform by determining locations of the suspected-location array entities based on locations of other array entities.

19. The non-transitory computer readable storage medium of claim 15, wherein the operations further comprise:
  applying the warped compensation transform by smoothing locations of different array entities based on differences between location deviations between adjacent array entities.

20. The non-transitory computer readable storage medium of claim 15, wherein the operations further comprise:
  finding a location of an array entity by (a) performing a correlation between a reference image of the array entity and a part of the warped image that comprises the array entity and a vicinity of the array entity, and (b) performing a two-dimensional sub-pixel matching.

* * * * *